Patented Apr. 24, 1951

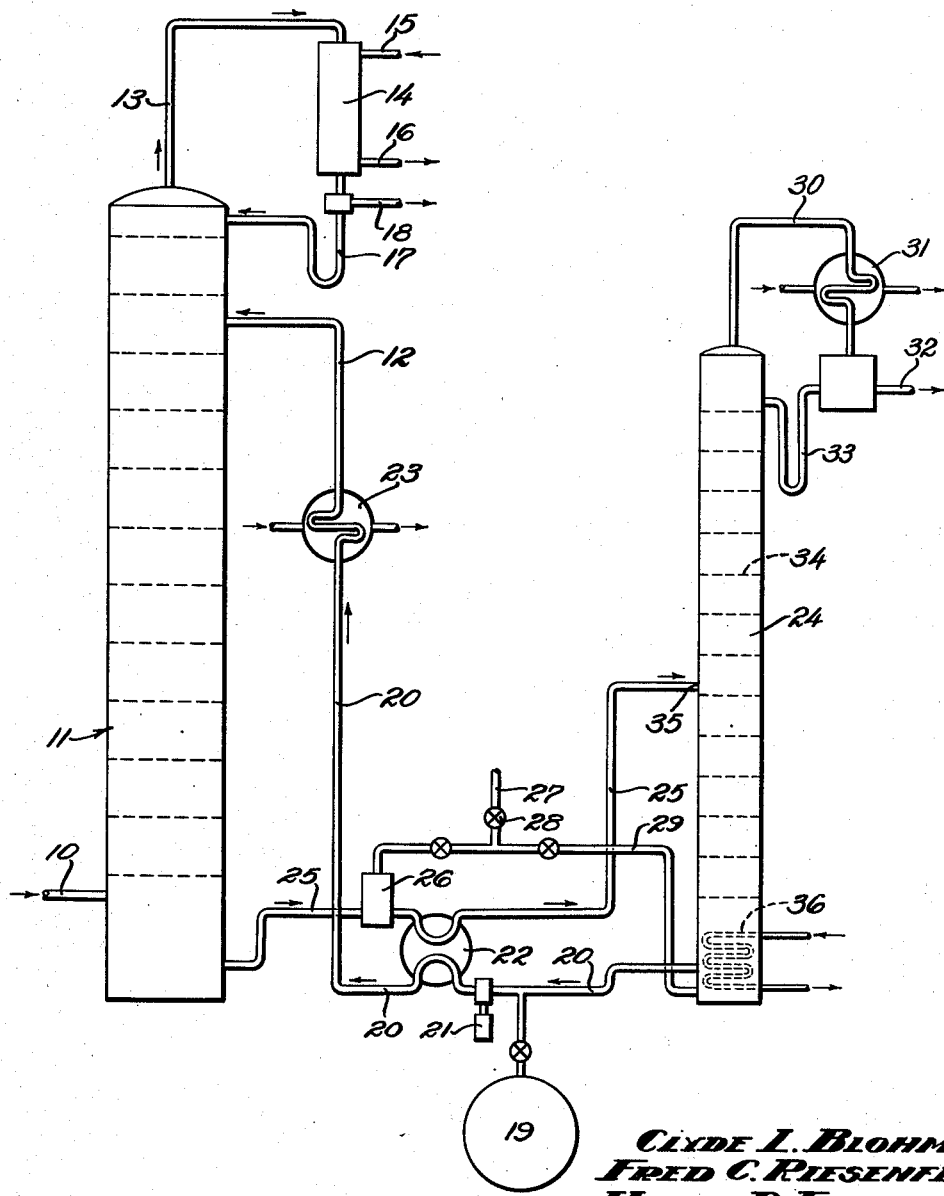

2,550,446

UNITED STATES PATENT OFFICE 2,550,446

EXTRACTION OF ACIDIC CONSTITUENTS FROM GASES

Clyde L. Blohm, Los Angeles, Fred C. Riesenfeld, Hollywood, and Henry D. Frazier, Alhambra, Calif., assignors to The Fluor Corporation, Ltd., Los Angeles, Calif., a corporation of California Application May 19, 1947, Serial No. 749,047

10 Claims. (Cl. 23—2)

This invention has generally to do with the treatment of gaseous mixtures such as natural and refinery gases, for the removal of acidic impurities including hydrogen sulfide, sulfur dioxide and carbon dioxide. The invention is particularly concerned with improvements in the type of process dealt with in the Hutchinson patent, No. 2,177,068, issued October 24, 1939, on "Process for Treating Gases," in accordance with which purification and dehydration of the gas are effected by a single stage contact with a solution of amine, glycol and water.

Such combination absorbents (employing for example solutions of monoethanolamine and diethylene glycol) have proven outstandingly successful in extensive commercial treating operations, for various reasons including the capacity of the solution to effect simultaneous dehydration and acid gas removal, and the absorption efficiency resulting from the completeness with which the solution may be regenerated.

Now it is generally desirable from a number of standpoints that the viscosity of such solutions be low, or substantially lower than the viscosities of the solutions heretofore used. Limitations have been encountered however by reason of the viscosities of the usable glycols and amines, and their required proportions in the solutions. As a result, such factors as heat transfer efficiencies, equipment size and expense, and to a degree the gas-liquid contact efficiencies, have been limited by the solution viscosities.

Our primary object is to provide important improvements over prior amine-glycol processes and treating solutions, with respect to substantial reductions of the solution viscosities, resulting in pronounced advantages, among which are the following: more efficient contact of the absorbent with the gas to be treated, higher heat transfer rates in both the contactor and heat exchangers, lower regeneration temperatures in the still, and more complete regeneration of the absorbent. These advantages permit a substantial overall reduction in plant costs, through the use of a smaller contactor, reboiler, heat exchangers, pumps and steam requirements.

We have discovered that by the addition of relatively low viscosity organic diluents to solutions containing an amine, or mixture of amines, and a glycol or polyhydric alcohol, the viscosities of such solutions can be substantially reduced, and to a degree permitting accomplishment of the named objects. The contemplated amines are those customarily employed for acid gas treatment, and may be classified particularly as the aliphatic amines in which the amino ($NH_2$) radical is attached to the methylene ($CH_2$) group, which in turn may be attached to one or more aliphatic or straight chain groups, saturated or unsaturated, or to a saturated or unsaturated ring, e. g. benzylamine. These amines include the primary, secondary, and tertiary form as well as members of the mono-, di-, triamine series of the various aliphatic amines, monoethanolamine, diethanolamine, and triethanolamine, and others of this group are highly satisfactory. At this point it may be mentioned that the invention makes possible the use of amines normally unusable by reason of their high viscosities, in that the presence of an organic diluent of the character later described, may be used to lower an otherwise excessively high viscosity solution to within practical viscosity limits.

The contemplated glycols are included in the general class of the liquid polyhydric aliphatic alcohols, either with or without an ether group. Typical are members of the ethylene glycol series, of which diethylene glycol in the past has been extensively used.

It is to be understood that the invention contemplates broadly the use of any suitable organic diluent having, by reason of its viscosity, boiling point and solubility characteristics, the capacity for effectively lowering the viscosity of the amine-glycol solution, while permitting the diluted solution to retain its characteristic properties with respect to capacity for dehydration and acid gas absorption. The following designation is given of the class of compounds which are found satisfactory for use as diluents.

(1) Monohydric aliphatic alcohols of lower viscosity than the corresponding polyhydric alcohols.

(2) Substituted monohydric aliphatic alcohols having a benzene ring in their structure such as benzyl alcohol and phenylethyl alcohol.

(3) Aromatic and alicyclic monohydric alcohols such as phenol, its homologues and cyclohexanol.

(4) Heterocyclic monohydric alcohols such as furfuryl alcohol and tetrahydrofurfuryl alcohol.

(5) Water soluble monoethers of polyhydric alcohols, such as carbitols and cellosolves, particularly carbitol, butyl carbitol, cellosolve and phenylcellosolve.

(6) Water soluble, multiple ethers of polyhydric alcohols such as dimethoxytetraglycol.

(The compounds listed under (5) and (6) include generally derivatives of polyhydric alcohols having a lower viscosity than their parental polyhydric alcohol).

(7) Aromatic and cyclic nitrogen bases such as aniline and pyridine.

Preferably the percentage of diluent in the solution will exceed the glycol, this being permissible to give desirably low solution viscosity, while permitting the solution to retain all the advantages of a glycol-amine absorbent. Preferably the diluent will be selected to have mutual solubility with the amine, glycol, and water in the rich solution containing the absorbed acid gas. In this manner the stability of the solution composition is assured under all conditions existing within the process cycle.

The following table is illustrative of typical compositions containing monoethanolamine and diethanolamine, together with water and diethylene glycol in the proportions indicated. The tabulated viscosities show that by reason of the presence of the diluent, the solution viscosities are reduced well below those of the conventional absorbents. (A conventional absorbent consists of 75% diethylene glycol, 20% monoethanolamine, 5% water; lean solution viscosity of 19 centistokes, and the rich solution viscosity of 70 centistokes at an amine to acid gas ratio of 0.5).

| Per Cent MEA | Per Cent DEA | Per Cent H$_2$O | Per Cent DEG | Per Cent Diluent | Lean Vis. Cstks, 91° F. | Rich Vis. Cstks, 91° F. | R |
|---|---|---|---|---|---|---|---|
| 20 | | 5 | 25 | Butyl Carbitol 50 | 11.0 | 36.0 | 0.5 |
| | 35 | 5 | 20 | Butyl Carbitol 40 | 24.2 | 78.0 | 0.5 |
| | 30 | 5 | 22 | Butyl Carbitol 43 | 20.5 | 50.5 | 0.5 |

MEA=monoethanolamine.
DEA=diethanolamine.
DEG=diethylene glycol.
R=ratio acid gas to mols amine.

In general it may be stated that we prefer to use in monoethanolamine-diethylene glycol solutions, a percentage of diluent sufficiently high to maintain the rich solution viscosity below 60 centistokes at 91° F., and in a corresponding solution containing diethanolamine instead of monoethanolamine, to maintain the rich solution viscosity below 90 centistokes at 91° F. Mixtures of monoethanolamine and diethanolamine may be used in the same solution, say in equal portions, and the diluent added in an amount bringing the rich solution viscosity below 80 centistokes. In the foregoing, the mol ratio of acid gas to equivalent amine in the rich solution may be assumed at 0.5. With further reference to the properties of the diluent, it generally will be preferred to use a diluent having at atmospheric pressure a boiling temperature within the range from 350° F. to 550° F.

The invention will be further understood by reference to the accompanying flow sheet illustrative of the absorption and regeneration cycle as employed in actual plant operation. Typically, the absorbent used in the system may be assumed to consist of a mixture of 20% by weight of monoethanolamine, 25% diethylene glycol, 50% butyl carbitol, and 5% water.

The gas to be treated is taken through line 10 into the base of the moisture and acid gas absorber 11 which, as will be understood, may be of any suitable type and construction capable of effecting intimate contact between the rising gas stream and the downwardly flowing liquid dehydrating and acid gas removal agent being introduced into the upper interior of the absorber through line 12. The treated gas leaving the absorber through outlet 13 may be passed through condenser 14 through which a cooling medium is circulated via lines 15 and 16 to remove condensible constituents of the absorbent that may be carried by the outlet gas. Any condensate formed is returned to the absorber through line 17 and the treated gas is taken through line 18 to the gas distributing main.

The treating solution may be supplied to the system from a suitable storage tank 19 and introduced to line 20 within which the absorbent is forced by pump 21 through heat exchanger 22 and cooler 23 to the absorber 11. Heat exchanger 22 is utilized to effect preliminary cooling of the denuded absorbent coming from still 24, by heat transference to the enriched absorbent being circulated from the base of the absorber through line 25 to the still. In cooler 23 the temperature of the absorbent flowing through line 20 is further and finally reduced to increase the absorbing capacity and efficiency of the absorbent mixture in accordance with conditions existing in the absorber. The enriched absorbent taken from the base of the absorber 11 may be passed into a vent tank 26 located in line 25 between the absorber and heat exchanger 22 and maintained at any suitable pressure less than the absorber pressure. Liberation of entrained gases and dissolved gases from the vent tank permits their recovery and reduces materially the vapor load on the still 24. The liberated gases may be released from the vent tank for disposal through line 27 containing a back pressure control valve 28, or the separated gases may be passed through line 29 into the base of the still 24. This latter expedient may be desirable particularly where the acid gas absorbed by the solution is comparatively low, for the purpose of utilizing the partial pressure of the vented vapor and gas to aid in stripping the absorbent in the still and reducing the required temperature of regeneration of the treating solution. However, instead of using these vent gases as stripping aid, and subsequently discharging them to the atmosphere, they may be taken from the vent tank through suitable valves and lines and used for boiler fuel or other desired purposes. As will be understood, the absorbent leaving the vent tank may be pumped or forced by the vent tank pressure through the heat exchanger 22 into the still.

In flowing downwardly through the absorber 11 the liquid absorbs the acid gas and moisture from the natural gas, the percentage of gas or moisture extraction being controllable by regulation of the several variables: temperature, absorbent-to-acid gas ratio and the composition of the absorbent. The enriched absorbent leaving the base of the absorber through line 25 is passed to still 24 wherein it is heated under any desired pressure conditions to a temperature at which regeneration of the solution and removal of the acid gas will occur, and at which the water content of the absorbent is reduced to a predetermined desired point, say 5% by weight of the absorbent. The absorbent, depleted of the acid gas and moisture to the desired extent, then leaves the base of the still through line 20 to be returned to the absorber, and the removed water vapor, reflux and acid gases are discharged through line 30 to a suitable cooler 31. Uncondensed vapors and gases are sent to disposal through line 32.

If, for the purpose of aiding regeneration of the treating solution, or for any other reason, it is desirable to supply additional water to the still as reflux, water condensate may be returned from the final condenser 31 through line 33 and passed downwardly over a sufficient number of plates 34 in the still above the absorbent inlet 25. It is also possible to use steam condensate from the reboiler as a source of reflux water, in which event the final condenser 31 may be eliminated. When used, the water reflux serves the dual purpose of preventing the loss of chemicals and supplying sufficient steam for regeneration. The extent to which the absorbent is dehydrated may be controlled by regulation of the temperature within the base of the still. For this purpose the still may contain a bottom coil 36 supplied with steam to maintain a predetermined temperature to which the absorbent is heated.

By virtue of the presence of the glycol and viscosity reducing agent in the solution, both hydrogen sulfide and carbon dioxide can be expelled practically completely in the regenerating stage. This is of great importance because the practical absence of hydrogen sulfide in the lean solution returning to the absorber, and the resultant extremely small partial pressure of hydrogen sulfide, permits the production of treated gas containing less than one-tenth of one grain of hydrogen sulfide per 100 standard cubic feet of gas. Although some of the mentioned viscosity reducing agents may have a rather poor dehydrating capacity, it has been found that the addition of such compounds to solutions containing amine and polyhydric alcohol does not impair the dehydrating capacity of the latter. In the case of the mentioned amine-glycol-butyl carbitol-water solution, the same dew points were obtained that could be expected with a ternary solution containing 20% by weight of monoethanolamine, 75% by weight of diethylene glycol, and 5% by weight of water.

We claim:

1. The method of treating a gas for dehydration and removal of carbon dioxide contained therein, that comprises contacting the gas with a solution containing an amine, water, a polyhydric alcohol and an organic diluent of the class consisting of monohydric aliphatic alcohols, aromatic and alicyclic monohydric alcohols, heterocyclic monohydric alcohols, water soluble ethers of polyhydric alcohols, and aromatic and cyclic nitrogen bases to dehydrate the gas and form a rich solution containing the carbon dioxide-amine reaction product dissolved therein, and heating and regenerating the rich solution for reuse.

2. The method of treating a gas for dehydration and removal of carbon dioxide contained therein, that comprises contacting the gas with a solution containing an amine, water, a polyhydric alcohol and an organic diluent of the class consisting of monohydric aliphatic alcohols, aromatic and alicyclic monohydric alcohols, heterocyclic monohydric alcohols, water soluble ethers of polyhydric alcohols, and aromatic and cyclic nitrogen bases to dehydrate the gas and form a rich solution containing the carbon dioxide-amine reaction product dissolved therein, and heating and regenerating the rich solution for reuse, said rich solution having substantially lower viscosity than a corresponding rich solution in which the diluent is replaced by said polyhydric alcohol.

3. The method of treating a gas for dehydration and removal of carbon dioxide contained therein, that comprises contacting the gas with a solution containing an amine, water, a polyhydric alcohol and an organic diluent of the class consisting of monohydric aliphatic alcohols, aromatic and alicyclic monohydric alcohols, heterocyclic monohydric alcohols, water soluble ethers of polyhydric alcohols, and aromatic and cyclic nitrogen bases to dehydrate the gas and form a rich solution containing the absorbed impurity, and heating and regenerating the rich solution for reuse, the water polyhydric alcohol, diluent and reaction product of the amine and carbon dioxide being mutually soluble in the rich solution.

4. The method of treating a gas for dehydration and removal of carbon dioxide contained therein, that comprises contacting the gas with a solution containing an amine, water, a polyhydric alcohol and an organic diluent of the class consisting of monohydric aliphatic alcohols, aromatic and alicyclic monohydric alcohols, heterocyclic monohydric alcohols, water soluble ethers of polyhydric alcohols, and aromatic and cyclic nitrogen bases to dehydrate the gas and form a rich solution containing the carbon dioxide-amine reaction product dissolved therein, and heating and regenerating the rich solution for reuse, said diluent having substantially lower viscosity than the polyhydric alcohol.

5. The method of treating a gas for dehydration and removal of carbon dioxide contained therein, that comprises contacting the gas with a solution containing an amine, water, a polyhydric alcohol and an organic diluent of the class consisting of monohydric aliphatic alcohols, aromatic and alicyclic monohydric alcohols, heterocyclic monohydric alcohols, water soluble ethers of polyhydric alcohols, and aromatic and cyclic nitrogen bases to dehydrate the gas and form a rich solution containing the carbon dioxide-amine reaction product dissolved therein, and heating and regenerating the rich solution for reuse, said diluent having substantially lower viscosity than the polyhydric alcohol and being present in the solution in larger proportion than the polyhydric alcohol.

6. The method of treating a gas for dehydration and removal of carbon dioxide contained therein, that comprises contacting the gas with a solution containing an amine, water, a polyhydric alcohol and an organic diluent of the class consisting of monohydric aliphatic alcohols, aromatic and alicyclic monohydric alcohols, heterocyclic monohydric alcohols, water soluble ethers of polyhydric alcohols, and aromatic and cyclic nitrogen bases to dehydrate the gas and form a rich solution containing the carbon dioxide-amine reaction product dissolved therein, and heating and regenerating the rich solution for reuse, said diluent having a boiling temperature between 350° F. to 550° F.

7. The method of treating a gas for dehydration and removal of carbon dioxide contained therein, that comprises contacting the gas with a solution containing an amine, water, a polyhydric alcohol and an organic diluent of the class consisting of monohydric aliphatic alcohols, aromatic and alicyclic monohydric alcohols, heterocyclic monohydric alcohols, water soluble ethers of polyhydric alcohols, and aromatic and cyclic nitrogen bases to dehydrate the gas and form a rich solution containing the carbon dioxide-amine reaction product dissolved therein, and heating and regenerating the rich solution for reuse, said rich solution having at a temperature of 91° F. a viscosity less than 90 centistokes.

8. The method of treating a gas for dehydration and removal of an acidic impurity of the group consisting of hydrogen sulphide, sulfur dioxide and carbon dioxide, that comprises contacting the gas with a solution containing an amine, water, a polyhydric alcohol and an organic diluent of the class consisting of monohydric aliphatic alcohols, aromatic and alicyclic monohydric alcohols, heterocyclic monohydric alcohols, water soluble ethers of polyhydric alcohols, and aromatic and cyclic nitrogen bases to dehydrate the gas and form a rich solution containing the carbon dioxide-amine reaction product dissolved therein, and heating and regenerating the rich solution for reuse, the water, polyhydric alcohol, diluent and reaction product of the amine and impurity being mutually soluble in the rich solution, and the rich solution having at a temperature of 91° F. a viscosity less than 90 centistokes.

9. The method of treating a gas for dehydration and removal of carbon dioxide contained therein, that comprises contacting the gas with a solution containing monoethanolamine, water, polyhydric alcohol and butyl carbitol to dehydrate the gas and form a rich solution containing the carbon dioxide-amine reaction product dissolved therein, and heating and regenerating the rich solution for reuse.

10. The method of treating a gas for dehydration and removal of carbon dioxide contained therein, that comprises contacting the gas with a solution containing monoethanolamine, water, polyhydric alcohol and butyl carbitol to dehydrate the gas and form a rich solution containing the carbon dioxide-amine reaction product dissolved therein, and heating and regenerating the rich solution for reuse, the butyl carbitol being present in an amount greater than the alcohol and said rich solution having at a temperature of 91° F. a viscosity less than 60 centistokes.

CLYDE L. BLOHM.
FRED C. RIESENFELD.
HENRY D. FRAZIER.

REFERENCES CITED

The following references are of record in the file of this patent:

UNITED STATES PATENTS

| Number | Name | Date |
| --- | --- | --- |
| 1,882,289 | Lush | Oct. 11, 1932 |
| 2,139,375 | Miller et al. | Dec. 6, 1938 |
| 2,161,663 | Baehr et al. | June 6, 1939 |
| 2,177,068 | Hutchinson | Oct. 24, 1939 |
| 2,395,509 | Shaw | Feb. 26, 1946 |